United States Patent
Stultz

(10) Patent No.: US 7,200,701 B2
(45) Date of Patent: Apr. 3, 2007

(54) SYSTEM AND METHOD FOR PROCESSING SYSTEM MANAGEMENT INTERRUPTS IN A MULTIPLE PROCESSOR SYSTEM

(75) Inventor: Paul D. Stultz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 10/926,666

(22) Filed: Aug. 26, 2004

(65) Prior Publication Data

US 2006/0047876 A1 Mar. 2, 2006

(51) Int. Cl.
G06F 13/24 (2006.01)
G06F 13/32 (2006.01)

(52) U.S. Cl. ..................... 710/267; 710/260

(58) Field of Classification Search ............... 710/260, 710/267

See application file for complete search history.

(56) References Cited

U.S. PATENT DOCUMENTS

| | | | | |
|---|---|---|---|---|
| 5,619,705 A * | 4/1997 | Karnik et al. | ............... | 710/266 |
| 5,809,329 A * | 9/1998 | Lichtman et al. | ............... | 710/8 |
| 5,987,538 A * | 11/1999 | Tavallaei et al. | ............... | 710/48 |
| 6,272,618 B1 * | 8/2001 | Tyner et al. | ................... | 712/31 |
| 6,357,016 B1 | 3/2002 | Rodgers et al. | ............. | 713/601 |
| 6,370,606 B1 | 4/2002 | Bonola | ........................ | 710/260 |
| 6,496,925 B1 | 12/2002 | Rodgers et al. | ............. | 712/244 |
| 6,711,642 B2 * | 3/2004 | Huang | ........................ | 710/260 |
| 6,889,319 B1 * | 5/2005 | Rodgers et al. | ............. | 712/228 |
| 2004/0186988 A1 * | 9/2004 | Polyudov | ..................... | 713/100 |
| 2004/0236997 A1 * | 11/2004 | Poo | ............................. | 714/36 |

* cited by examiner

Primary Examiner—Mark H. Rinehart
Assistant Examiner—Christopher Daley
(74) Attorney, Agent, or Firm—Baker Botts L.L.P.

(57) ABSTRACT

A system and method for processing system management interrupts in multiple processor systems is disclosed. In one embodiment, a method for processing a system management interrupt (SMI) in an information handling system including, for each processor, identifying whether the processor is an interrupt handling processor assigned to perform processing tasks necessary for resolving the SMI or a non-interrupt handling processor not assigned to perform the processing tasks necessary for resolving the SMI. The method further including, for each non-interrupt handling processor, setting the non-interrupt handling processor into a wait for Start-up Inter-Processor Interrupt (SIPI) mode. The method further including, for the interrupt handling processor, performing the processing tasks necessary for resolving the SMI such that upon entry into a SMI handler the interrupt handling processor enters and exits the SMI handler without synchronization with the non-interrupt handling processors.

20 Claims, 2 Drawing Sheets

SYSTEM AND METHOD FOR PROCESSING SYSTEM MANAGEMENT INTERRUPTS IN A MULTIPLE PROCESSOR SYSTEM

TECHNICAL FIELD

The present disclosure relates generally to information handling systems and, more particularly, to a system and method for processing system management interrupts in a multiple processor system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including computer systems, typically include at least one microprocessor, memory, and various input and output devices. The components of a computer system are communicatively coupled together using one or more interconnected buses. As an example, the architecture of a computer system may include a processor that is coupled to a processor bus or host bus. In the case of multiprocessor computer systems, two or more processors may be coupled to the processor bus. A memory controller bridge may be coupled between the processor bus and system memory. In addition, a PCI bridge may be coupled between the processor bus to the PCI bus of the computer system. In some computer systems, the memory controller bridge and the PCI bridge are incorporated into a single device, which is sometimes referred to as the north bridge of the computer system. An expansion bridge, sometimes referred to as a south bridge, couples the PCI bus to an expansion bus, such as the ISA bus. The south bridge also serves as a connection point for USB devices and an IDE bus. The south bridge may also include an interrupt controller.

The processor architecture of a computer system will typically support several types of interrupts. An interrupt is a notification given to the processor that causes the processor to halt the execution of code such as operating code and handle a condition that has arisen in the system or in one of the system's external devices. As an example, when a key is pressed on the keyboard, an interrupt is passed to the processor from the peripheral controller. The interrupt causes the processor to momentarily stop its current execution stream and receive data from the peripheral controller. Another type of interrupt is a system management interrupt (SMI). Typically, a SMI is the highest order interrupt that can be issued in a computer system. A SMI is often issued when it is necessary for the processor to handle an error condition in the computer system.

When a system management interrupt is issued to the processor, the processor enters system management mode. In a multiple processor environment, because every processor receives the system management interrupt, each of the processors of the computer system will enter system management mode. As part of system management mode, each processor of the system is allocated a memory block of random access memory (RAM). This memory space is known as system management RAM or SMRAM. Upon entering system management mode, each processor saves the contents of its registers to its block of allocated SMRAM space.

In multiple processor computer systems, the time required for the handling of a system management interrupt is influenced by the amount of time spent saving processor information to and restoring processor information from the SMRAM associated with each processor. Typically, in a multiple processor computer system, each processor of the computer system will enter a system management interrupt mode, even though only one processor of the computer system will be selected to actually handle the processing associated with the system management interrupt. As such, in a multiprocessor system, each processor must have control of the processor bus and access to system memory in order to enter into and exit from the system management interrupt mode. Because each processor typically attempts to enter into and exit from system management interrupt mode at the same time, the processors typically contend for control of the processor bus and access to memory.

In multiple processor computer systems, the contention by the processors for control of the processor bus and access to memory causes a delay in the handling of a system management interrupt. For example, a number of system management interrupts are typically issued in a power on self test (POST) procedure or the booting of a computer system from a USB device. The contention by the processors for access to the processor bus or memory is a significant contributor to the time necessary for the completion of these events. The process of resolving resource conflicts among multiple processors concerning control of the processor bus and access to memory adds a significant delay to the time associated with resolving a system management interrupt in multiple processor computer systems.

SUMMARY

Therefore, a need has arisen for a system and method for processing system management interrupts in a multiple processor system.

In accordance with one embodiment of the present disclosure, a method for processing a system management interrupt (SMI) in an information handling system includes, for each processor, identifying whether the processor is in an interrupt handling processor assigned to perform processing tasks necessary for resolving the SMI or non-interrupt handling processor not assigned to perform the processing tasks necessary for resolving the SMI. The method further including, for each non-interrupt handling processor, setting the non-interrupt handling processor into a wait for start up interprocessor interrupt (SIPI) mode. The method further including, for the interrupt handling processor, performing the processing tasks necessary for resolving the SMI such that upon entry into a SMI handler, the interrupt handling processor enters and exits the SMI handler without synchronization with the non-interrupt handling processors.

In a further embodiment, an information handling system includes a plurality of processors coupled to a processor bus and memory coupled to the processor bus. The plurality of processors, including non-interrupt handling processors and an interrupt handling processor, wherein each of the non-interrupt handling processors are set into a start up interprocessor interrupt mode such that the interrupt handling processor processes a system management interrupt in a SMI handler without synchronization with the non-interrupt handling processors.

In accordance with a further embodiment of the present disclosure, a computer-readable medium having computer-executable instructions for performing a method of processing a system management interrupt (SMI) in an information handling system includes instructions for identifying whether each processor in a multiple processor information handling system includes an interrupt handling processor assigned to perform processing tasks necessary for resolving the SMI or a non-interrupt handling processor not assigned to perform that processing tasks necessary for resolving the SMI. The instructions further including instructions for setting the non-interrupt handling processors into a wait for SIPI mode such that entry into a SMI handler the interrupt handling processor enters and exits the SMI handler without synchronization with the non-interrupt handling processors.

One technical advantage of the present disclosure is the entry and exits into SMI assertions without the need for synchronization with processors set into a wait for SIPI mode. Because the processor placed into a wait for SIPI mode is not synchronized upon entry and exit into a SMI handler, a boot processor such as a interrupt handling processor may enter and exit more quickly from a SMI assertion to complete a booting sequence or state more rapidly.

Another technical advantage of the present disclosure is that speed of booting a multiprocessor system. Because adding processors to an information handling system increases the requirement for memory space for each processor, each additional processor causes the system to use more resources and processing time which may delay a boot up process. As such, a SMI assertion may further delay a booting state because each processor in the system will have to be synchronized prior to entry and exit from a SMI assertion. By setting non-booting processors, such as application processors, into a wait for SIPI mode, these processors may be bypassed for synchronization allowing the boot processor to complete the SMI assertion without having to be delayed for synchronization.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
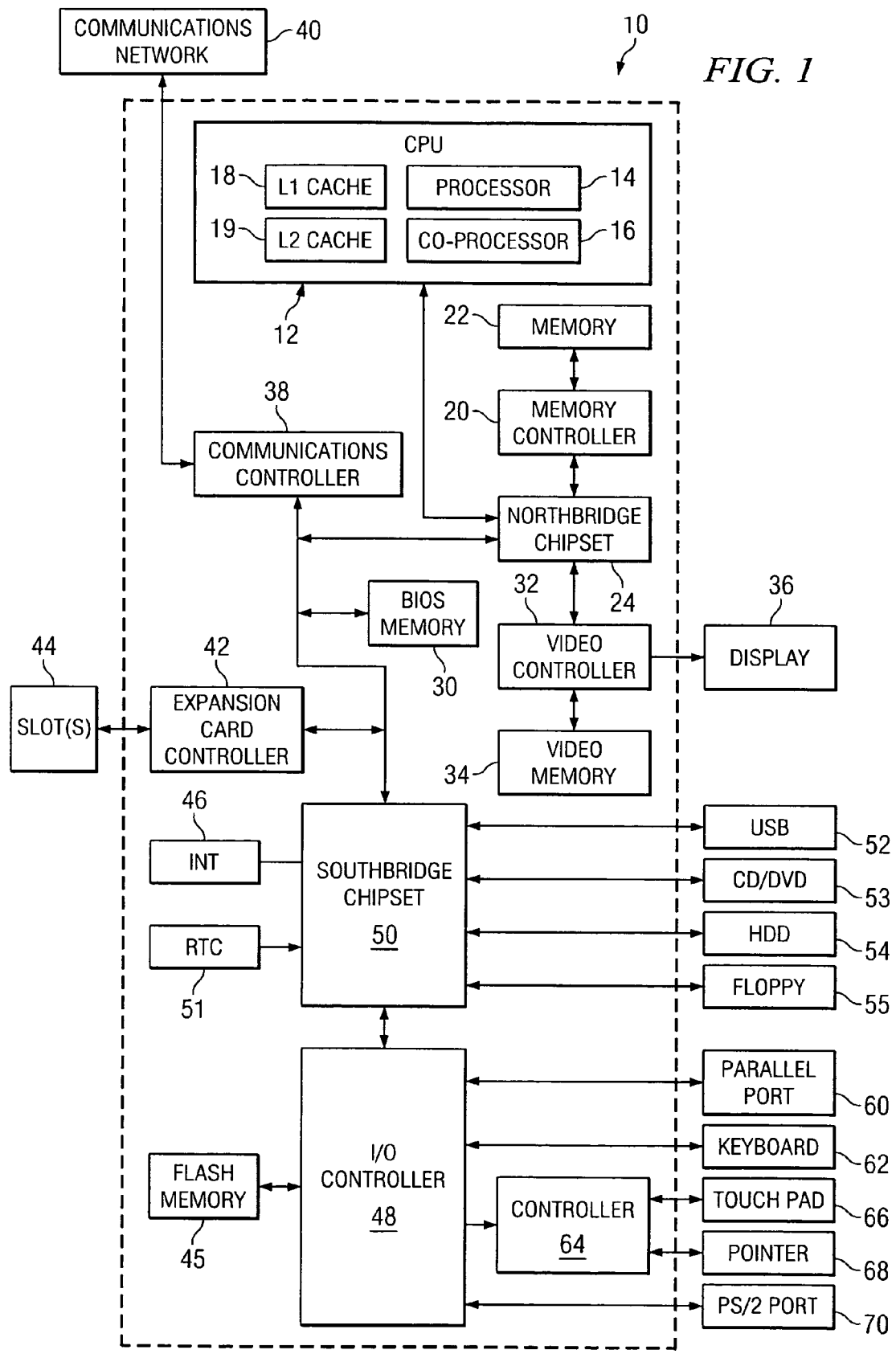
FIG. 1 is a block diagram showing an information handling system, according to teachings of the present disclosure.

Referring first to FIG. 1, a block diagram of information handling system 10 is shown, according to teachings of the present disclosure. Information handling system 10 or computer system preferably includes one or more microprocessors such as central processing unit (CPU) 12. CPU 12 may include processor 14 for handling integer operations and coprocessor 16 for handling floating point operations. CPU 12 is preferably coupled to cache, such as L1 cache 18 and L2 cache 19 and a chipset, commonly referred to as Northbridge chipset 24, via a frontside bus 23. Northbridge chipset 24 preferably couples CPU 12 to memory 22 via memory controller 20. Main memory 22 of dynamic random access memory (DRAM) modules may be divided into one or more areas such as system management mode (SMM) memory area (not expressly shown).

Graphics controller 32 is preferably coupled to Northbridge chipset 24 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Northbridge chipset 24 serves as a "bridge" between CPU bus 23 and the connected buses. Generally, when going from one bus to another bus, a bridge is needed to provide the translation or redirection to the correct bus. Typically, each bus uses its own set of protocols or rules to define the transfer of data or information along the bus, commonly referred to as the bus architecture. To prevent communication problem from arising between buses, chipsets such as Northbridge chipset 24 and Southbridge chipset 50, are able to translate and coordinate the exchange of information between the various buses and/or devices that communicate through their respective bridge.

Basic input/output system (BIOS) memory 30 is also preferably coupled to PCI bus 25 connecting to Southbridge chipset 50. FLASH memory or other reprogrammable, nonvolatile memory may be used as BIOS memory 30. A BIOS program (not expressly shown) is typically stored in BIOS memory 30. The BIOS program preferably includes software which facilitates interaction with and between information handling system 10 devices such as a keyboard 62, a mouse such as touch pad 66 or pointer 68, or one or more I/O devices. BIOS memory 30 may also store system code (note expressly shown) operable to control a plurality of basic information handling system 10 operations.

Communication controller 38 is preferably provided and enables information handling system 10 to communicate with communication network 40, e.g., an Ethernet network. Communication network 40 may include a local area network (LAN), wide area network (WAN), Internet, Intranet, wireless broadband or the like. Communication controller 38 may be employed to form a network interface for communicating with other information handling systems (not expressly shown) coupled to communication network 40.

In certain information handling system embodiments, expansion card controller 42 may also be included and is preferably coupled to PCI bus 25 as shown. Expansion card controller 42 is preferably coupled to a plurality of information handling system expansion slots 44. Expansion slots 44 may be configured to receive one or more computer components such as an expansion card (e.g., modems, fax cards, communications cards, and other input/output (I/O) devices).

Southbridge chipset 50, also called bus interface controller or expansion bus controller preferably couples PCI bus 25 to an expansion bus. In one embodiment, expansion bus may be configured as an Industry Standard Architecture ("ISA") bus. Other buses, for example, a Peripheral Component Interconnect ("PCI") bus, may also be used.

Interrupt request generator 46 is also preferably coupled to Southbridge chipset 40. Interrupt request generator 46 is preferably operable to issue an interrupt service request over a predetermined interrupt request line in response to receipt of a request to issue interrupt instruction from CPU 12. Southbridge chipset 40 preferably interfaces to one or more universal serial bus (USB) ports 52, CD-ROM (compact disk-read only memory) or digital versatile disk (DVD) drive 53, an integrated drive electronics (IDE) hard drive device (HDD) 54 and/or a floppy disk drive (FDD) 55. In one example embodiment, Southbridge chipset 40 interfaces with HDD 54 via an IDE bus (not expressly shown). Other disk drive devices (not expressly shown) which may be interfaced to Southbridge chipset 40 include a removable hard drive, a zip drive, a CD-RW (compact disk-read/write) drive, and a CD-DVD (compact disk—digital versatile disk) drive.

Real-time clock (RTC) 51 may also be coupled to Southbridge chipset 50. Inclusion of RTC 74 permits timed events or alarms to be activated in the information handling system 10. Real-time clock 74 may be programmed to generate an alarm signal at a predetermined time as well as to perform other operations.

I/O controller 48, often referred to as a super I/O controller, is also preferably coupled to Southbridge chipset 50. I/O controller 48 preferably interfaces to one or more parallel port 60, keyboard 62, device controller 64 operable to drive and interface with toubh?? pad 66 and/or pointer 68, and PS/2 Port 70. FLASH memory or other nonvolatile memory may be used with I/O controller 48.

Generally, chipsets 24 and 50 may further include decode registers to coordinate the transfer of information between CPU 12 and a respective data bus and/or device. Because the number of decode registers available to chipset 24 or 50 may be limited, chipset 24 and/or 50 may increase the number or I/O decode ranges using system management interrupts (SMI) traps.

Typically, during start-up of information handling system 10, a BIOS initialization or power on self test (POST) may operate or run on system 10 in the form of a pre-operating system (pre-OS) environment. Generally, in a typical system having multiple processors, when a system management interrupt (SMI) occurs, each processor responds to that SMI, which may affect the performance of USB devices controlled during the pre-OS environment. Because one processor such as the boot processor (BP) usually handles tasks during the pre-OS environment, the remaining processors such as the application processors (AP) may not need to respond to the SMI.

Figure 2:
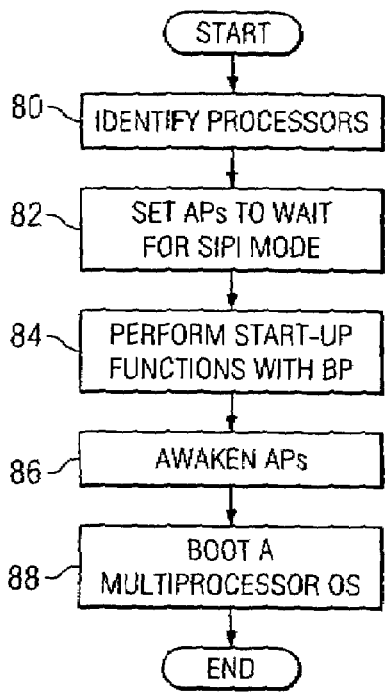
FIG. 2 is a flowchart for setting non-interrupt handling processors into a wait for SIPI mode in a pre-OS environment in an information handling system, according to teachings of the present disclosure.

FIG. 2 is a flowchart for setting non-interrupt handling processors into a wait for SIPI mode in a pre-OS environment in information handling system 10. At block 80, information handling system 10 identifies whether a processor in the system is an interrupt handling processor or a non-interrupt handling processor.

Typically, during a power up state, commonly referred to as a booting state that may initiate from turning on the computer or by a hardware reset, information handling system 10 recognizes and identifies the processors in the system. As such, the system enters a booting state, information handling system 10 identifies interrupt handling processors such as a boot processor (BP) and non-interrupt handling processors such as application processors (AP). Generally, interrupt handling processor are assigned to perform processing tasks necessary for resolving a SMI and a non-interrupt handling processor are not assigned to processing tasks necessary for resolving the SMI.

At block 82, information handling system 10 sets each of the non-interrupt handling processors into a wait for start-up inter-processor interrupt (SIPI) mode. Information handling system 10 may activate or set a status bit that is associated with each processor to indicate whether the processor has been placed in the wait for SIPI mode. It should be noted and recognized that the status bit may include a bit, flag, semaphore or other indicator in the computer system that is associated with one of several processors. In one embodiment, the status bit is located in the SMRAM associated with the processor, although it should be recognized that the status bit may be implemented in some other configuration and it may be possible in some implementations for multiple processors to share a single variable such as a status bit. The location of the status bit of each processor in system memory permits the status bit of each processor to be read or set by another processor.

Information handling system 10 may continue with the booting or start-up process, as shown in block 84. During the booting process, one or more interrupts may be initiated.

Because the non-interrupt handling processors typically the application processors are set to wait for SIPI mode, the non-interrupt handling processors will store the first interrupt in memory but will not handle the interrupt due to the wait for SIPI mode setting. As such, the interrupt handling processor will handle the interrupt without waiting for the non-interrupt handling processors for entry and exit from an interrupt handler (shown below in more detail).

Information handling system 10 awakens the non-interrupt handling processors, such as the application processors, as shown in block 86. Information handling system 10 changes the setting for the non-interrupt handling processors from a wait for SIPI mode into a normal operating mode. The change in mode is typically performed by altering the status bit or changing the flag indicating the wait for SIPI mode. In some embodiments, the change in mode is performed at the completion of the booting state.

Because a SMI or interrupt status may have been stored in memory for the processor, each non-interrupt handling processor will typically enter into a SMI handler such that the processor is no longer in a wait for SIPI mode, whereby the non-interrupt handling processor "awakens." Once entered into the handler, the non-interrupt handling process may update its status. At which point, information handling system 10 may continue to operate in a standard or normal operating mode.

Following the awakening of the non-interrupt processor, information handling system 10 may boot a multi-processor operating system such that all the processors both application and boot processors are in a standard operating mode, as shown at block 88.

Figure 3:
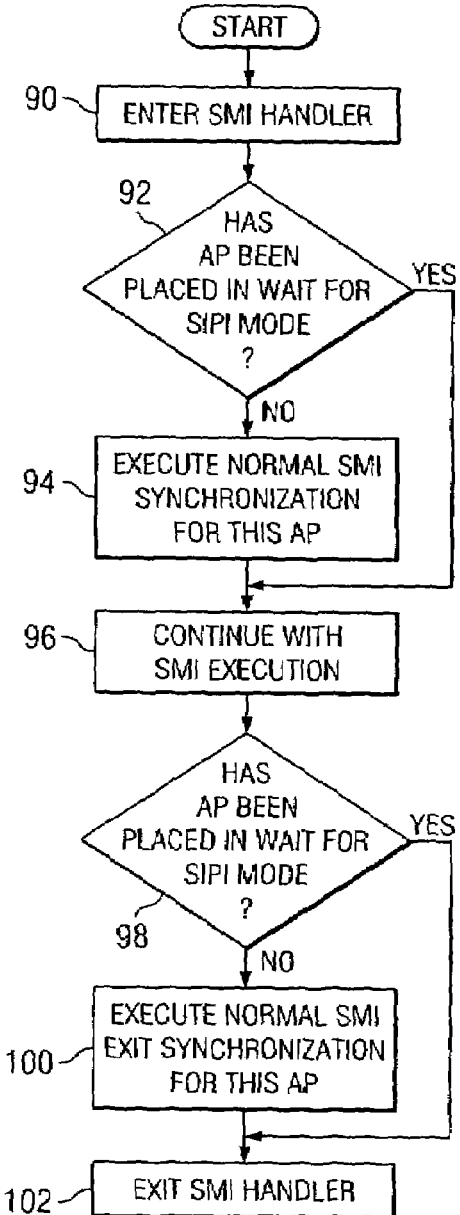
FIG. 3 is a flowchart for a method of handling a SMI assertion in the information handling system having multiple processors, according to teachings of the present disclosure.

FIG. 3 is a flowchart for a method of handling a SMI assertion in an information handling system 10 having multiple processors. At block 90, information handling system 10 enters a SMI handler. Generally, at the assertion of an interrupt, information handling system 10 may cause the process to enter into the SMI handler to process the interrupt.

Upon entry into the SMI handler, information handling system 10 determines, for each processor, whether the processor such as the application processor has been placed in a wait for SIPI mode. In some embodiments, the determination is performed by detecting the presence of a status bit set for each processor. If the status bit for the processor was not set into wait for SIPI mode, the SMI handler continues along a normal execution for SMI handling including this processor, as shown in block 94. For example, on entry into the SMI handler, all processors that are not set to the wait for SIPI mode must be synchronize. If the application processor had been placed in wait for SIPI mode, as shown at block 96, the SMI handler continues with the SMI execution without synchronization with the processor set into the wait for SIPI mode.

Generally, all processors in the system enter into the SMI handler. As such, the processors are synchronized prior to entry into and exit from the SMI handler. However, by placing one or more non-interrupt handling processors into a wait for SIPI mode, the SMI handler will continue with the SMI assertion without synchronization with these processors placed in the wait for SIPI mode. As such, the SMI handler will not wait until for a time-out process for these process but will continue with the SMI assertion. As such, a processor placed in the wait for SIPI mode may not respond to a system SMI assertion and thus may be overlooked or bypassed for synchronization upon entry and exit into the SMI handler. Therefore, any processor that has entered into the SMI handler will continue with the SMI assertion regardless of the application processor that has been into the wait for SIPI mode.

However, once the wait for SIPI mode has been removed from the processor, the processor will be synchronized upon entry and exit from the SMI handler. As such, removal of the wait for SIPI mode generally causes these processors to enter into the SMI handler wither by the assertion of a SMI in a normal mode or as soon as the processor receives a SIPI and has a pending SMI that occurred when the processor was in the wait for SIPI mode. And with the wait for SIPI mode changed, the processors are synchronized upon entry and exit.

Figure 4:
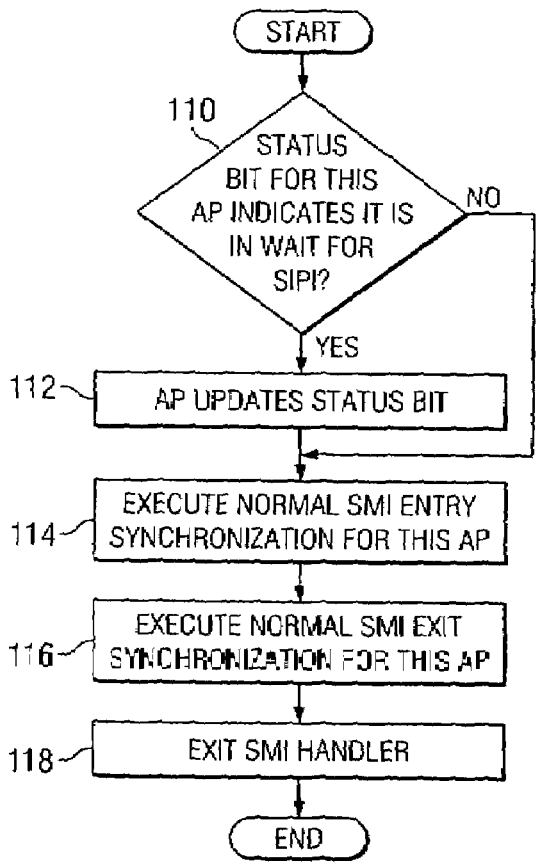
FIG. 4 is a flowchart for waking a non-interrupt handling processor and entering a SMI handler in the information handling system having multiple processors, according to teachings of the present disclosure.

Generally, the process of updating the processor is perform during a SMI in the SMI handler as shown in FIG. 4. Upon entry into the SMI handler, the non-interrupt handling processor that is no longer in the wait for SIPI mode is determined whether or not the status bit for the processor indicates the wait for SIPI mode, as shown at block 110. If the processor indicates that the status bit still indicates that the processor is in the wait for SIPI mode, the processor updates a status bit such as a flag indicating that the processor is no longer in the wait for SIPI mode and that the processor is to be synchronized upon entry and exit from the SMI handler, as shown at block 112. Once the status bit is updated, the processor will execute normal SMI entry synchronization as shown at block 114. Similarly, the processor will execute normal SMI exit synchronization as shown at block 116. Once synchronized, the processors will exit the SMI handler as shown at block 118.

The non-interrupt handling processors set into the wait for SIPI mode may store a SMI assertion in a pending register waiting execution upon the removal of the status bit indicating that it has been placed in wait for SIPI mode. As such, when the wait for SIPI mode has been removed from the processor, the processor will automatically go into a SMI assertion and update its status. However, in some embodiments, because the wait for SIPI mode has been removed from all of the processors, each processor will have to be synchronized upon entry and exit from the SMI handler while updating their status.

At block 98, the boot processor has performed the SMI assertion and is now waiting to exit the SMI handler. Typically, exiting a SMI handler requires synchronization of all processors. As such, each of the processors must be synchronized unless the processor has been placed in wait for SIPI mode. At block 98, the system determines whether an application processor has been in wait for SIPI mode. If the processor has not been placed in wait for SIPI mode, at block 100, the processors continue executing normal SMI exit synchronization for this processor such that all processors that were not placed in wait for SIPI mode are synchronized for exit prior to exiting the SMI handler. However, if the processor was placed into wait for SIPI mode, at block 102 all the processors continue exiting the SMI handler.

By placing one or more of the application processors into a wait for SIPI mode, the boot processor may handle and execute SMIs without the need for waiting to synchronize with application processors that are not used to handle interrupts during this booting process. Generally, application processors would time out, causing the system delays in asserting a SMI. However, by setting the application processors into a wait for SIPI mode, the boot processor may bypass synchronization with these processors and continue with the SMI assertion.

Although the disclosed embodiments have been described in detail, it should be understood that various changes, substitutions and alterations can be made to the embodiments without departing from their spirit and scope.

What is claimed is:

1. A method for processing a system management interrupt (SMI) in an information handling system, comprising:
for each processor, identifying whether the processor is an interrupt handling processor assigned to perform processing tasks necessary for resolving the SMI or a non-interrupt handling processor not assigned to perform the processing tasks necessary for resolving the SMI;
for each non-interrupt handling processor, setting the non-interrupt handling processor into a wait for Start-up Inter-Processor Interrupt (SIPI) mode; and
for the interrupt handling processor, performing the processing tasks necessary for resolving the SMI such that upon entry into a SMI handler the interrupt handling processor enters and exits the SMI handler without synchronization with the non-interrupt handling processors.

2. The method of claim 1, further comprising maintaining the non-interrupt handling processors in the wait for SIPI mode during a pre-operating system (pre-OS) environment.

3. The method of claim 2, wherein the pre-OS environment comprises a basic input/output system (BIOS) initialization.

4. The method of claim 2, wherein the pre-OS environment comprises a power on self test (POST) setup.

5. The method of claim 2, further comprising:
upon completion of a pre-OS environment, removing the setting of wait for SIPI mode for each non-interrupt handling processor; and
following the removal of the wait for SIPI mode, updating the status of each processor in the information handling system.

6. The method of claim 5, further comprising loading a multi-processor operating system on the information handling system.

7. The method of claim 1, wherein setting the non-interrupt handling processor into the wait for SIPI mode comprises activating a flag for each processor that indicates whether the processor has been set into the wait for SIPI mode.

8. An information handling system, comprising:
a plurality of processors coupled to a processor bus; and
a memory coupled to the processor bus;
the plurality of processors including a non-interrupt handling processor and an interrupt handling processor, wherein the interrupt handling processor processes a system management interrupt (SMI) in a SMI handler and exits the SMI handler without synchronization with the non-interrupt handling processor.

9. The information handling system of claim 8 wherein the non-interrupt handling processors comprise an application processor.

10. The information handling system of claim 8 wherein the interrupt handling processors comprise a boot processor.

11. The information handling system of claim 8, wherein the non-interrupt handling processor is set into a wait for Start-up Inter-Processor Interrupt (SIPI) mode during a booting state.

12. The information handling system of claim 11, wherein the booting state comprises a power on self test (POST) operation.

13. A computer-readable medium having computer-executable instructions for performing a method of processing a system management interrupt (SMI) in an information handling system, comprising:
instructions for identifying whether each processor in a multiple processor information handling system comprises an interrupt handling processor assigned to perform processing tasks necessary for resolving the SMI or a non-interrupt handling processor not assigned to perform processing tasks necessary for resolving the SMI; and
instructions for setting the non-interrupt handling processors into a wait for Start-up Inter-Processor Interrupt (SIPI) mode such that upon entry into a SMI handler the interrupt handling processor enters and exits the SMI handler without synchronization with the non-interrupt handling processors.

14. The computer-readable medium of claim 13, wherein instructions for setting the non-interrupt handling processors into a wait for SIPI mode further comprise placing a flag status for each non-interrupt handling processor.

15. The computer-readable medium of claim 13, further comprising instructions for maintaining the non-interrupt handling processors in the wait for SIPI mode during a booting state.

16. The computer-readable medium of claim 15, wherein the booting state comprises a pre-operating system (pre-OS) state.

17. The computer-readable medium of claim 15, wherein the booting state comprises a basic input/output system (BIOS) setup.

18. The computer-readable medium of claim 15, wherein the booting state comprises a power on self test (POST) setup.

19. The computer-readable medium of claim 15, further comprising:
instructions for removing the setting of wait for SIPI mode for each of the non-interrupt handling processors upon completion of the booting state; and
instructions for updating the status of each processor in the information handling system.

20. The computer-readable medium of claim 13, further comprising instructions for loading a multi-processor operating system on the information handling system.

* * * * *